US012596236B2

(12) United States Patent
Leeson et al.

(10) Patent No.: US 12,596,236 B2
(45) Date of Patent: Apr. 7, 2026

(54) OPTICAL FIBER CABLE TRAY CLIP STRUCTURALLY CONFIGURED TO PIVOTALLY CONNECT TWO TRAYS TOGETHER TO LIMIT ACCESS TO LOWER TRAY

(71) Applicant: PPC BROADBAND, INC., East Syracuse, NY (US)

(72) Inventors: Kim Leeson, Ipswich (GB); Shaun Trezise, Aldeburgh (GB)

(73) Assignee: PPC BROADBAND, INC., East Syracuse, NY (US)

( * ) Notice: Subject to any disclaimer, the term of this patent is extended or adjusted under 35 U.S.C. 154(b) by 354 days.

(21) Appl. No.: 18/375,334

(22) Filed: Sep. 29, 2023

(65) Prior Publication Data

US 2024/0111112 A1 Apr. 4, 2024

Related U.S. Application Data

(60) Provisional application No. 63/411,737, filed on Sep. 30, 2022.

(51) Int. Cl.
*G02B 6/00* (2006.01)
*G02B 6/44* (2006.01)

(52) U.S. Cl.
CPC .................................. *G02B 6/4455* (2013.01)

(58) Field of Classification Search
CPC ....... G02B 6/4455; G02B 6/4452; G02B 6/00
See application file for complete search history.

(56) References Cited

U.S. PATENT DOCUMENTS

| | | | |
|---|---|---|---|
| 6,009,224 A | 12/1999 | Allen | |
| 7,333,709 B2 * | 2/2008 | Carpenter | .......... G02B 6/44785 |
| | | | 385/136 |
| 2006/0067636 A1 * | 3/2006 | Bludau | ................ G02B 6/4453 |
| | | | 385/135 |
| 2011/0293235 A1 | 12/2011 | Nieves et al. | |
| 2016/0077298 A1 | 3/2016 | Wiltjer et al. | |
| 2022/0252808 A1 * | 8/2022 | Leeson | ................ G02B 6/4454 |

FOREIGN PATENT DOCUMENTS

EP 0215668 A2 3/1987

OTHER PUBLICATIONS

International Search Report and Written Opinion dated Jan. 30, 2024 in corresponding International Application No. PCT/US2023/034215, 12 pages.

* cited by examiner

*Primary Examiner* — Jennifer Doan
(74) *Attorney, Agent, or Firm* — MH2 TECHNOLOGY LAW GROUP LLP

(57) ABSTRACT

A coupling member for connecting two optical fiber cable trays includes: a first portion; a second portion at a first end of the first portion; a third portion at a second end of the first portion; a first tray receiving portion at the first end of the first portion; and a second tray receiving portion at the second end of the first portion. The first tray receiving portion may be configured to receive a first one of two optical fiber cable trays; the second tray receiving portion may be configured to receive a second one of the two optical fiber cable trays; and the coupling member may be configured to connect the two optical fiber cable trays together such that the two optical fiber cable trays are configured to pivot together so as to limit access to the second one of the two optical fiber cable trays.

23 Claims, 7 Drawing Sheets

OPTICAL FIBER CABLE TRAY CLIP STRUCTURALLY CONFIGURED TO PIVOTALLY CONNECT TWO TRAYS TOGETHER TO LIMIT ACCESS TO LOWER TRAY

CROSS-REFERENCE TO RELATED APPLICATION

This application claims the benefit of U.S. Provisional Application No. 63/411,737 filed Sep. 30, 2022, the disclosure of which is hereby incorporated by reference herein in its entirety.

BACKGROUND

The present invention relates generally to optical fiber cable management. More particularly, the present invention relates to a clip that clips together two optical fiber cable trays (cassettes) so that the trays are connected to each other when the trays are pivoted in a cable tray mounting bracket.

Optical fiber cable trays are used to splice and/or otherwise manage optical fibers in cable systems. In many applications, a plurality of optical fiber cable trays are mounted to a cable tray mounting backet in a stacked manner such that the cable trays can be individually pivoted relative to the mounting bracket to provide access to the optic fibers being managed by the particular cable tray. In some cases, it is desirable to limit access to a particular one of the cable trays and/or indicate that two adjacent cable trays are related to each other.

It may be desirable to provide a clip that is structurally configured to connect two cable trays to each other such that the two cable trays pivot together so as to prevent access to the lower of the two cable trays and/or indicate that the two cable trays are related.

SUMMARY

The present disclosure provides a clip that connects two optical fiber cable trays together to cause the two cable trays to pivot together in a cable tray mounting bracket such that access to the bottom tray of the two trays is limited. In particular, embodiments connect the two cable trays together to cause the two cable trays to pivot together while allowing the two cable trays to slide relative to each other.

Particular embodiments include a coupling member for connecting two optical fiber cable trays together, including: a middle portion extending in a first direction and having an upper end and a lower end at opposite ends along the first direction; an upper portion at the upper end of the middle portion and structurally configured to extend laterally from the middle portion; an upper engagement portion structurally configured to extend downward from the upper portion; a lower portion at the lower end of the middle portion and structurally configured to extend laterally from the middle portion; and a lower engagement portion structurally configured to extend upward from the lower portion. The upper engagement portion may be structurally configured to extend in a direction parallel to the first direction; the lower engagement portion may be structurally configured to extend in a direction parallel to the first direction; the upper engagement portion and the middle portion may be structurally configured to define an upper tray receiving portion; the lower engagement portion and the middle portion may be structurally configured to define a lower tray receiving portion; the upper tray receiving portion may be structurally configured to receive an upper lip of an upper one of two optical fiber cable trays; the lower tray receiving portion may be structurally configured to receive a lower lip of a lower one of the two optical fiber cable trays; and the coupling member may be structurally configured to connect the two optical fiber cable trays together such that the two optical fiber cable trays may be structurally configured to pivot together so as to limit access to the lower one of the two optical fiber cable trays.

In particular embodiments, the upper tray receiving portion may comprise an upper groove.

In particular embodiments, the lower tray receiving portion may comprise a lower groove.

In particular embodiments, the upper engagement portion may comprise an upper wing, and the lower engagement portion may comprise a lower wing.

In particular embodiments, the upper portion may be structurally configured to be offset from the lower portion in a second direction that is perpendicular to the first direction.

In particular embodiments, the upper engagement portion may be structurally configured to have a length in the second direction that is less than a length of the upper portion in the second direction.

In particular embodiments, the two optical fiber trays may be pivotably connected to a cable tray mounting bracket.

In particular embodiments, the coupling member may be structurally configured to connect the two optical fiber cable trays together such that the two optical fiber trays may be structurally configured to pivot together in the cable tray mounting bracket.

In particular embodiments, the lower engagement portion may be structurally configured to engage an opening in a lower area of the lower one of the two optical fiber cable trays; and the engagement of the lower engagement portion with the opening in a lower area of the lower one of the two optical fiber cable trays may be structurally configured to prevent the coupling member from moving relative to the lower one of the two optical fiber cable trays.

In particular embodiments, the upper engagement portion may be structurally configured to slide relative to the upper lip of the upper one of the two optical fiber cable trays to permit the upper one of the two optical fiber cable trays to move relative to the lower one of the two optical fiber cable trays when the two optical fiber cable trays are pivoted.

In particular embodiments, the upper engagement portion may be a first upper engagement portion, and the clip may further comprise a second upper engagement portion, and the lower engagement portion may be a first lower engagement portion, and the coupling member may further comprise a second lower engagement portion.

Particular embodiments include a coupling member for connecting two optical fiber cable trays together, including: a first portion extending in a first direction and having an upper end and a lower end at opposite ends along the first direction; a second portion at the upper end of the first portion and structurally configured to extend laterally from the first portion; a third portion at the lower end of the first portion and structurally configured to extend laterally from the first portion; a first tray receiving portion formed by the second portion and the first portion; and a second tray receiving portion formed by the third portion and the first portion. The first tray receiving portion may be structurally configured to receive an upper lip of an upper one of two optical fiber cable trays; the second tray receiving portion may be structurally configured to receive a lower lip of a lower one of the two optical fiber cable trays; and the coupling member may be structurally configured to connect the two optical fiber cable trays together such that the two optical fiber cable trays may be structurally configured to pivot together so as to limit access to the lower one of the two optical fiber cable trays.

In particular embodiments, a first engagement portion may be structurally configured to extend downward from the second portion and is structurally configured to be adjacent to the first tray receiving portion.

In particular embodiments, the first engagement portion may be structurally configured to extend in a direction parallel to the first direction.

In particular embodiments, a second engagement portion may be structurally configured to extend upward from the third portion and may be structurally configured to be adjacent to the second tray receiving portion.

In particular embodiments, the second engagement portion may be structurally configured to extend in a direction parallel to the first direction.

In particular embodiments, the second engagement portion may be structurally configured to engage an opening in a lower area of the lower one of the two optical fiber cable trays; and the engagement of the second engagement portion with the opening in a lower area of the lower one of the two optical fiber cable trays may be structurally configured to prevent the coupling member from moving relative to the lower one of the two optical fiber cable trays.

In particular embodiments, the first tray receiving portion may comprise two first tray receiving portions, and the second tray receiving portion may comprise two second tray receiving portions.

Particular embodiments include a coupling member for connecting two optical fiber cable trays together, including: a first portion having a first end and a second end opposite the first end; a second portion at the first end of the first portion and structurally configured to extend laterally from the first portion; a third portion at the second end of the first portion and structurally configured to extend laterally from the first portion; a first tray receiving portion at the first end of the first portion; and a second tray receiving portion at the second end of the first portion. The first tray receiving portion may be structurally configured to receive a portion of a first one of two optical fiber cable trays; the second tray receiving portion may be structurally configured to receive a portion of a second one of the two optical fiber cable trays; and the coupling member may be structurally configured to connect the two optical fiber cable trays together such that the two optical fiber cable trays may be structurally configured to pivot together so as to limit access to the second one of the two optical fiber cable trays.

Particular embodiments may further comprise a first engagement portion that may be structurally configured to extend from the second portion in a direction parallel to the first portion.

Particular embodiments may further comprise a second engagement portion that may be structurally configured to extend from the third portion in a direction parallel to the first portion.

In particular embodiments, the second engagement portion may be structurally configured to engage an opening in an area of the second one of the two optical fiber cable trays; and the engagement of the second engagement portion with the opening in the area of the second one of the two optical fiber cable trays may be structurally configured to prevent the clip from moving relative to the second one of the two optical fiber cable trays.

In particular embodiments, the first tray receiving portion may comprise two first tray receiving portions, and the second tray receiving portion may comprise two second tray receiving portions.

Various aspects of the system, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Embodiments of the disclosure provide a clip that connects two optical fiber cable trays together to cause the two cable trays to pivot together in a cable tray mounting bracket such that access to the bottom tray of the two trays is limited.

Figure 1:
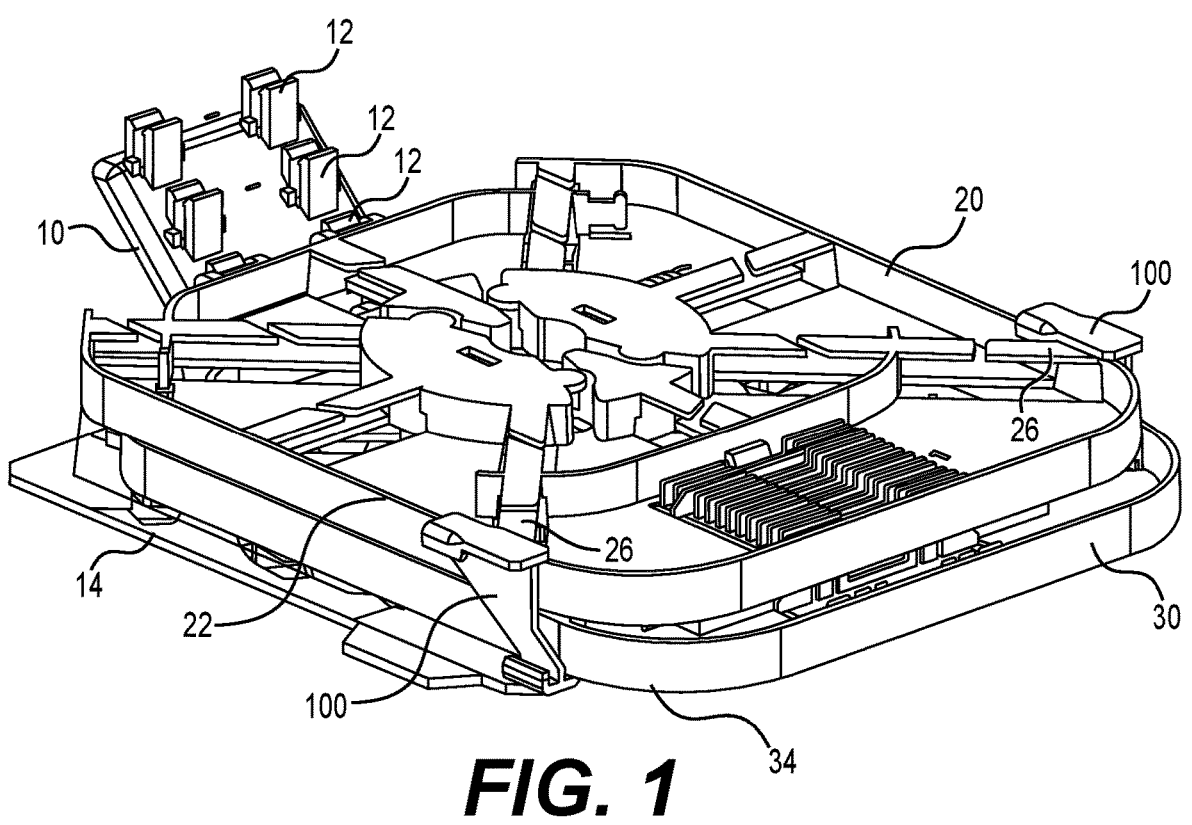
FIG. 1 is a perspective view of a cable tray clip in accordance with various aspects of the disclosure in place on two optical fiber cable trays.
Figure 8:
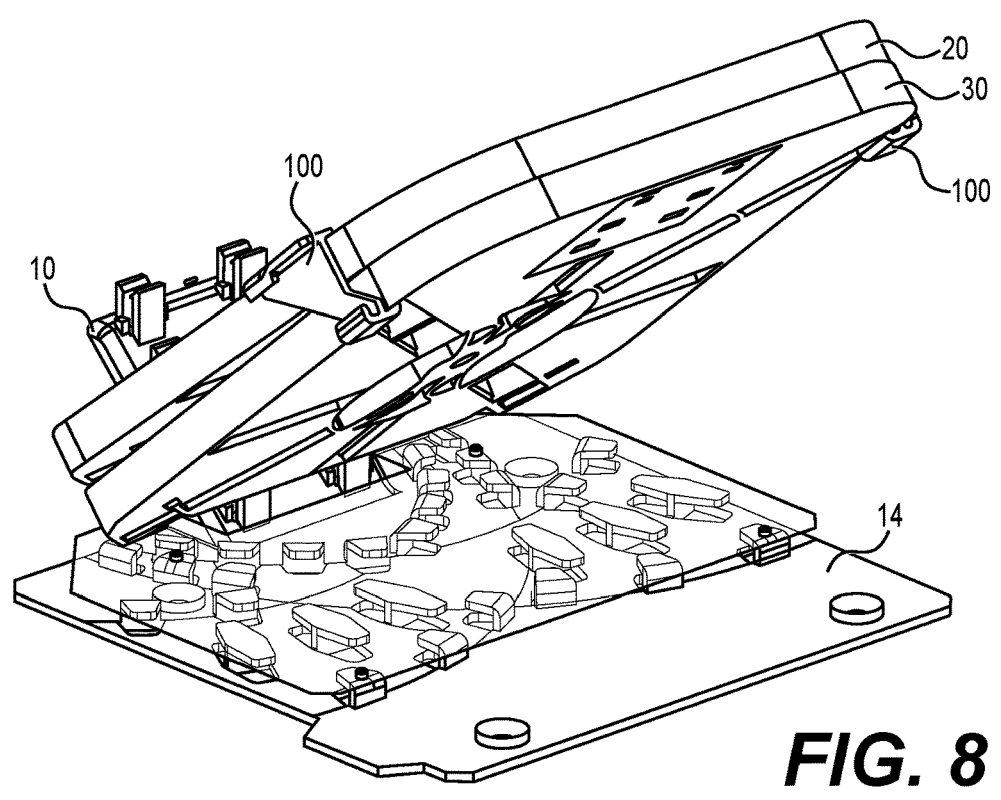
FIG. 8 is a perspective view of the assembly of FIG. 1 with the two optical fiber cable trays pivoted upward away from a base plate of the cable tray mounting bracket.
Figure 9:
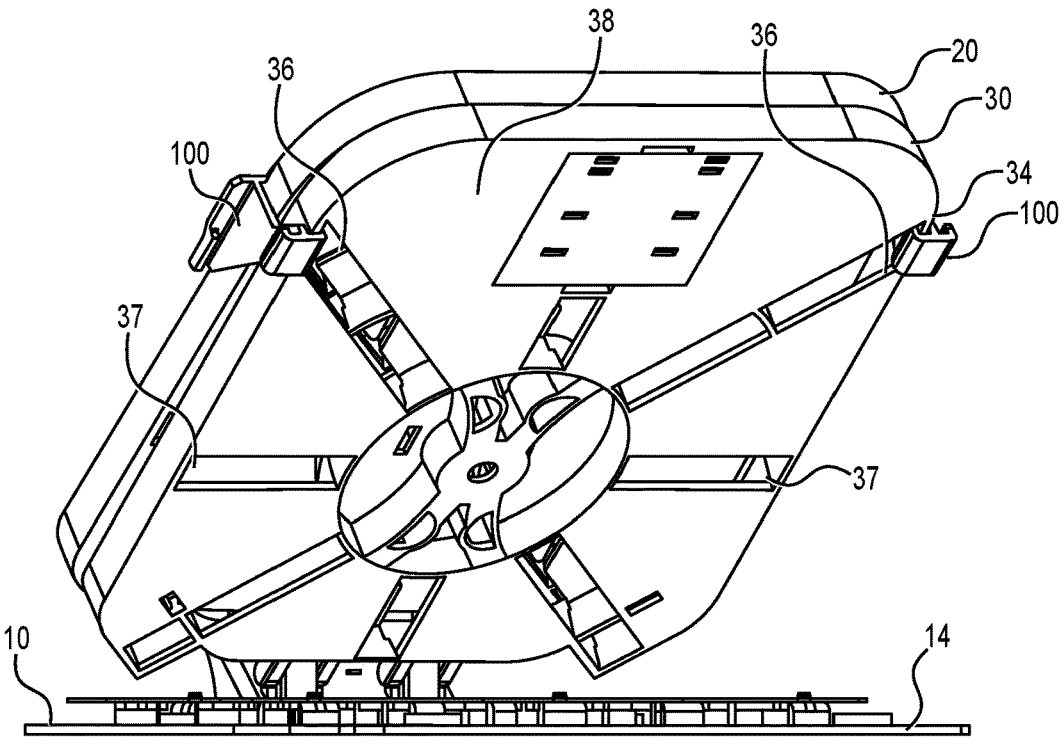
FIG. 9 is a perspective view of the assembly of FIG. 1 with the two optical fiber cable trays pivoted upward away from a base plate of the cable tray mounting bracket.
Figure 10:
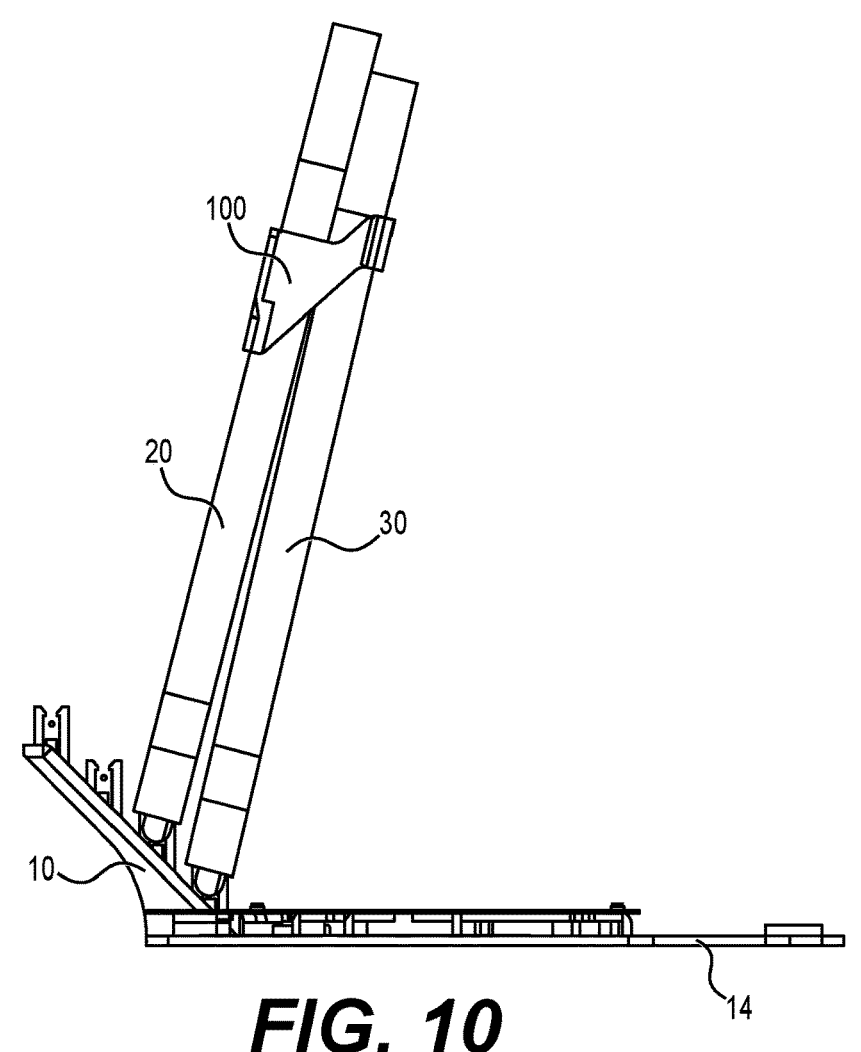
FIG. 10 is a side view of the assembly of FIG. 1 with the two optical fiber cable trays pivoted upward away from the base plate of the cable tray mounting bracket.

FIG. 1 shows a cable tray mounting bracket 10 to which two optical fiber cable trays 20, 30 are mounted. Cable trays 20, 30 are each connected to mounting bracket 10 at pivoting mounting points 12. In this example, mounting bracket 10 can hold up to four cable trays. In FIG. 1, only two of the possible four cable trays are connected to mounting bracket 10. Each cable tray 20, 30 can pivot relative to mounting bracket 10, as shown in FIGS. 8-10. During use, a particular cable tray, cable tray 20, for example, can be pivoted upward away from the cable tray immediately below it, cable tray 30, for example, to allow access to the lower cable tray. As shown in FIG. 1, cable tray 20 (and others of the cable trays), have features that facilitate optical fiber management and storage. Access to these features by users is necessary to splice and otherwise manage the optical fibers.

Figure 2:
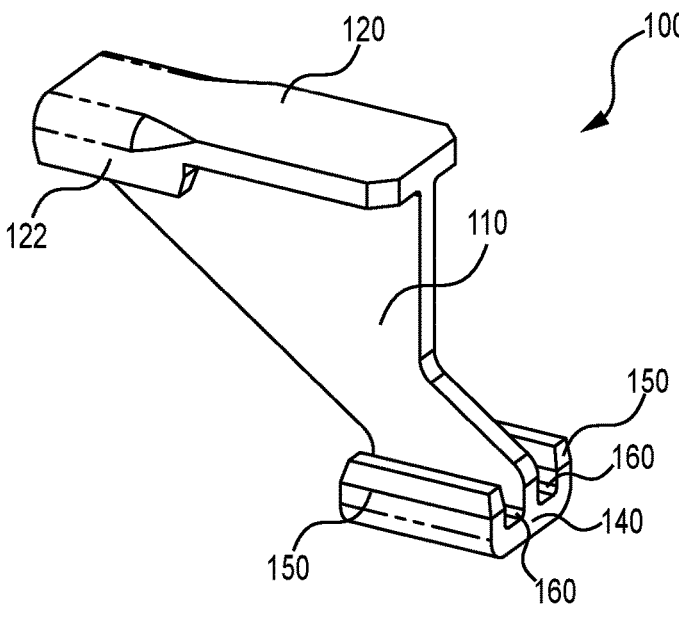
FIG. 2 is a perspective view of the cable tray clip of FIG. 1.

In some situations, it is desirable to limit access to a particular cable tray. For example, it may be desirable to prevent accidental access to a particular cable tray to prevent unintentional cutting or splicing of the optical fibers in that cable tray. To avoid such access to cable tray 30, in this example, a tray retainer, for example, coupling member, for example an optical fiber cable tray clip 100 is used to connect cable tray 20 to cable tray 30. An example of tray clip 100 is shown in FIG. 2. Two tray clips 100 are shown in use in FIG. 1. As shown in FIG. 1, tray clips 100 connect cable trays 20, 30 to each other.

Figure 3:
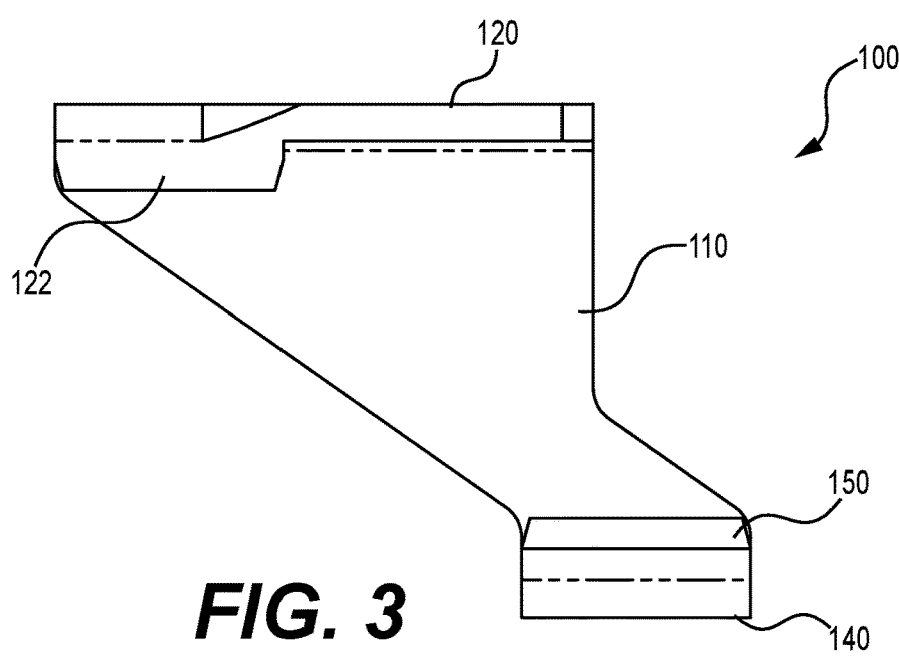
FIG. 3 is a side view of the cable tray clip of FIG. 1.

The example of tray clip 100 shown in FIG. 2 has a first portion, for example, a middle portion 110 that connects a second portion, for example, an upper portion or an upper plate 120 to a third portion, for example, a lower portion or a lower plate 140. Two first engagement portions, for example, upper engagement portions, for example, upper wings 122 extend downward from upper plate 120 to form first tray receiving portions, for example, upper tray receiving portions, for example, upper grooves 130 (see FIG. 4). Two second engagement portions, for example, lower engagement portions, for example, lower wings 150 extend upward from lower plate 140 to form second tray receiving portions, for example, lower tray receiving portions, for example, lower grooves 160. As shown in FIGS. 1-3, in this example, upper engagement wings 122 do not extend the entire length of upper plate 120. This allows upper plate 120 to extend over a first tray portion, for example, a bar 26 on cable tray 20 (see FIGS. 1, 12, 13), which provides additional stability to the connection of tray clip 100 to cable tray 20. This additional stability results from resistance to twisting of cable tray 20 relative to tray clip 100 due to bar 26 acting on a lower surface of upper plate 120 and helps prevent tray clip 100 from being dislodged from cable trays 20, 30. The offsetting of upper plate 120 (and upper engagement wings 122) from lower plate 140 (and lower engagement wings 150) provides resistance to forces exerted on tray clip 100 when cable trays 20, 30 are pivoted as a unit that could dislodge tray clip 100 from cable tray 20 and/or cable tray 30.

Figure 4:
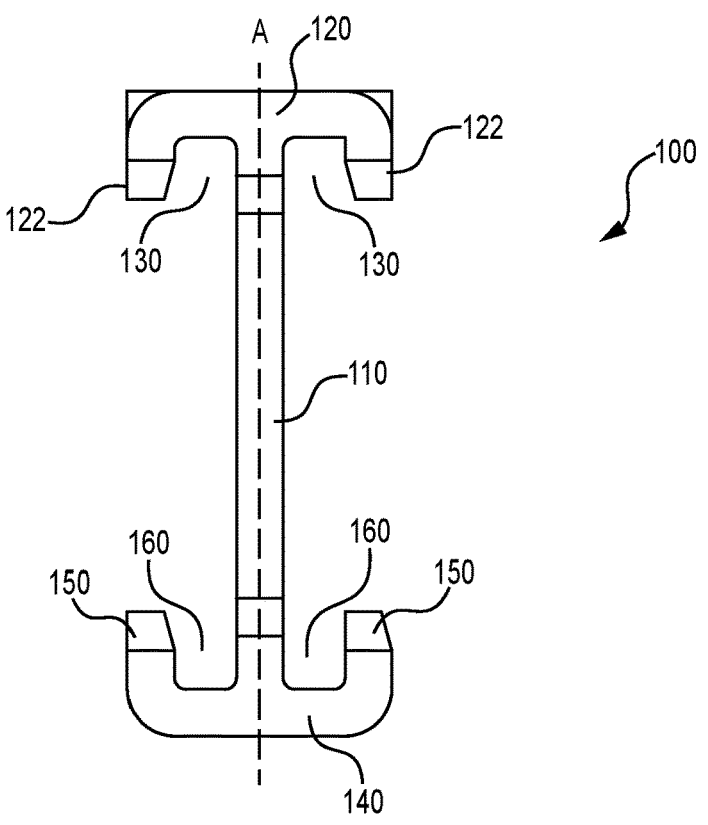
FIG. 4 is a rear view of the cable tray clip of FIG. 1.

As shown in FIG. 4, in this example, tray clip 100 is symmetrical relative to a vertical axis A. This symmetry allows tray clip 100 to be used on either side of the cable trays. As shown in FIG. 1, one tray clip 100 is used on each side of cable tray 20.

Figures 5, 6, 7:
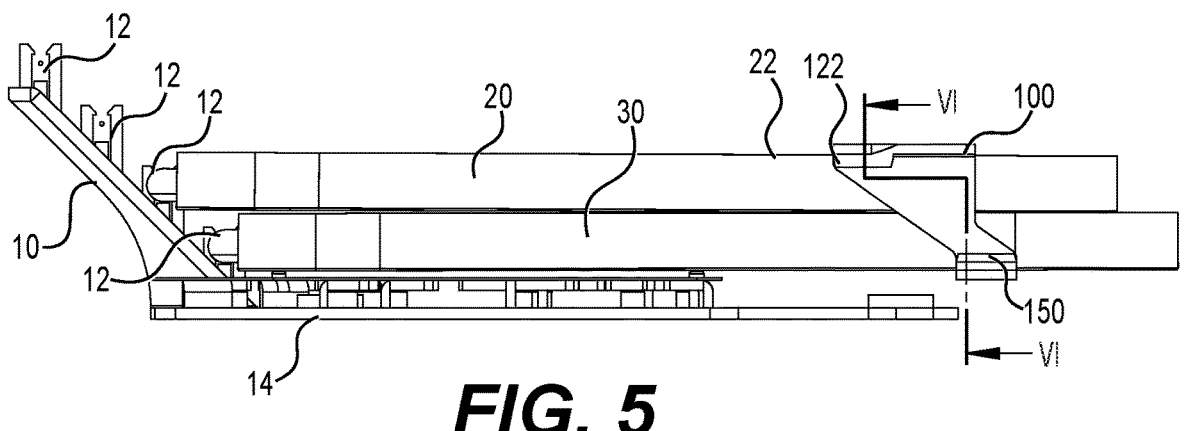
FIG. 5 is a side view of the cable tray clip of FIG. 1 in place on two optical fiber cable trays mounted to a cable tray mounting bracket.
FIG. 6 is a sectional view of the assembly of FIG. 5 taken along section line VI-VI in FIG. 5.
FIG. 7 is a magnified view of the portion of FIG. 6 in circle VII.

FIG. 5 is a side view of cable trays 20, 30 and tray clip 100 securing cable tray 20 to cable tray 30. In this example, cable tray 30 rests on a base plate 14 of mounting bracket 10, and cable tray 20 rests on cable tray 30. With cable tray 20 in this position, access to cable tray 30 is prevented. FIG. 6 shows a sectional view taken along section line VI-VI in FIG. 5, and FIG. 7 is a magnified view of the part of FIG. 6 designated by circle VII. As shown in FIG. 7, tray clip 100 secures cable tray 20 to cable tray 30 by engaging a second tray portion, for example, an upper lip 22 of cable tray 20 in groove 130, and engaging third tray portion, for example, a lower lip 34 of cable tray 30 in groove 160. As a result of these engagements, cable tray 20 cannot be separated from cable tray 30.

FIG. 8 shows cable tray 20 and cable tray 30 pivoted upward together in mounting bracket 10. As cable tray 30 is pivoted upward, tray clips 100 keep cable trays 20, 30 together and, as a result, cable tray 20 is also pivoted upward. As mentioned above, this prevents access to the features on the upper side of cable tray 30. FIG. 9 shows a bottom view of cable tray 30 in an upward pivoted position. Two open areas 36 are shown in a base portion, for example, a base plate 38 of cable tray 30. In this example, lower engagement wings 150 are configured to fit in open areas 36 to limit movement of tray clip 100 along lower lip 34 of cable tray 30. In this example, lower lip 34 exists only at open areas 36 and open areas 37. While movement of tray clip 100 relative to cable tray 30 is limited by the engagement of lower engagement wing 150 in open area 36, movement of tray clip 100 relative to cable tray 20 along upper lip 22 is not limited. As a result, tray clip 100 can slide relative to cable tray 20 as cable tray 20 and cable tray 30 are pivoted up and down.

Figure 11:
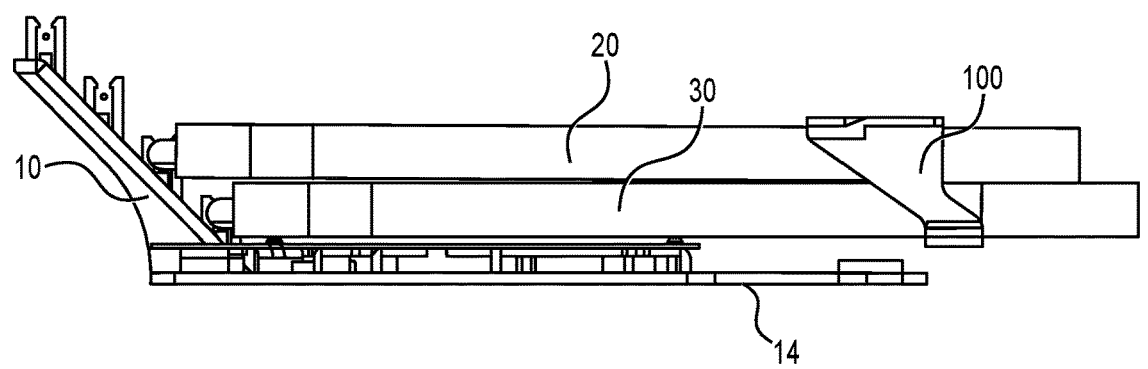
FIG. 11 is a side view of the assembly of FIG. 1 with the two optical fiber cable trays pivoted downward onto the base plate of the cable tray mounting bracket.

A comparison of FIGS. 10 and 11 shows how the position of cable tray 20 relative to cable tray 30 changes as cable trays 20, 30 are pivoted in mounting bracket 10. Flexibility of one or more of cable tray 20, cable tray 30, and tray clip 100 allows the ends of cable trays 20, 30 near mounting bracket 10 to separate when moved to the position shown in FIG. 10 without disengaging tray clip 100 or damaging tray 20, cable tray 30, or tray clip 100.

Figure 12:
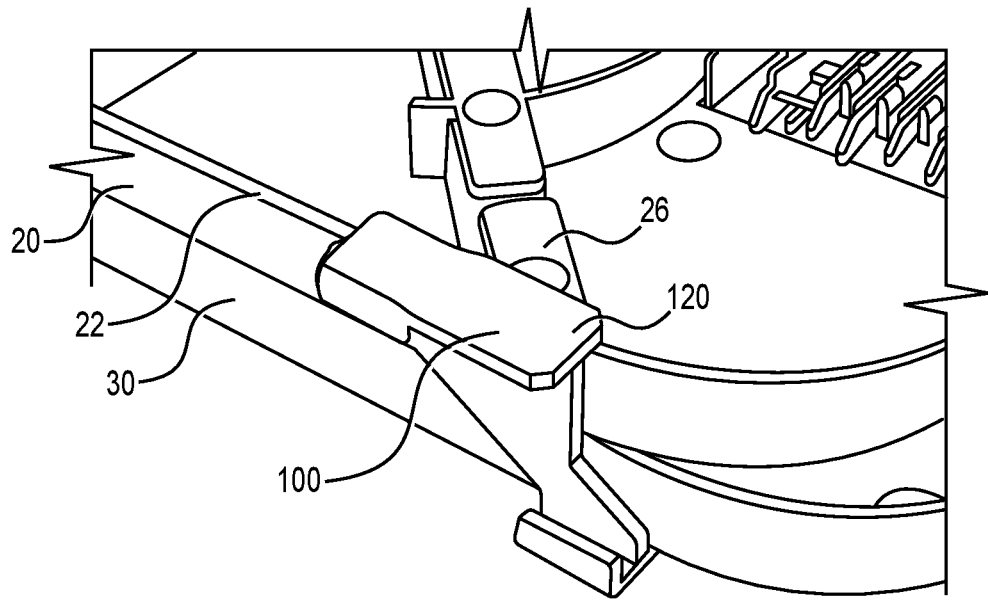
FIG. 12 is a partial perspective view of the cable tray clip of FIG. 1 mounted to two optical fiber cable trays.
Figure 13:
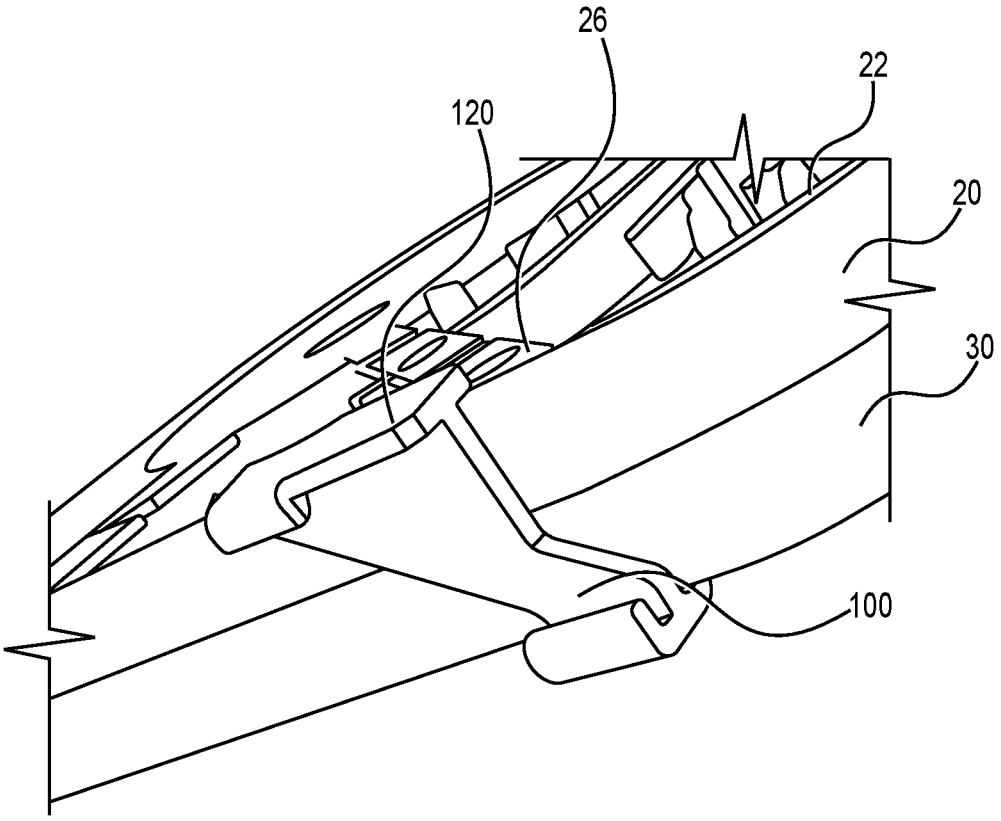
FIG. 13 is a partial perspective view of the cable tray clip of FIG. 1 mounted to two optical fiber cable trays.

FIG. 12 shows tray clip 100 in place on cable trays 20, 30 with cable trays 10, 30 in a lower position similar to the position shown in FIG. 11. In this position, upper plate 120 of tray clip 100 is shown over bar 26 of cable tray 20. FIG. 13 shows tray clip 100 in place on cable trays 20, 30 with cable trays 10, 30 in a pivoted position similar to the position shown in FIG. 10. In this position, upper plate 120 of tray clip 100 is shown only partially over bar 26 of cable tray 20. A comparison of FIGS. 12 and 13 shows how upper plate 120 moves relative to cable tray 20 and, more particularly, relative to bar 26 as cable trays 20, 30 are pivoted between the positions shown in FIGS. 10 and 11.

Figure 14:
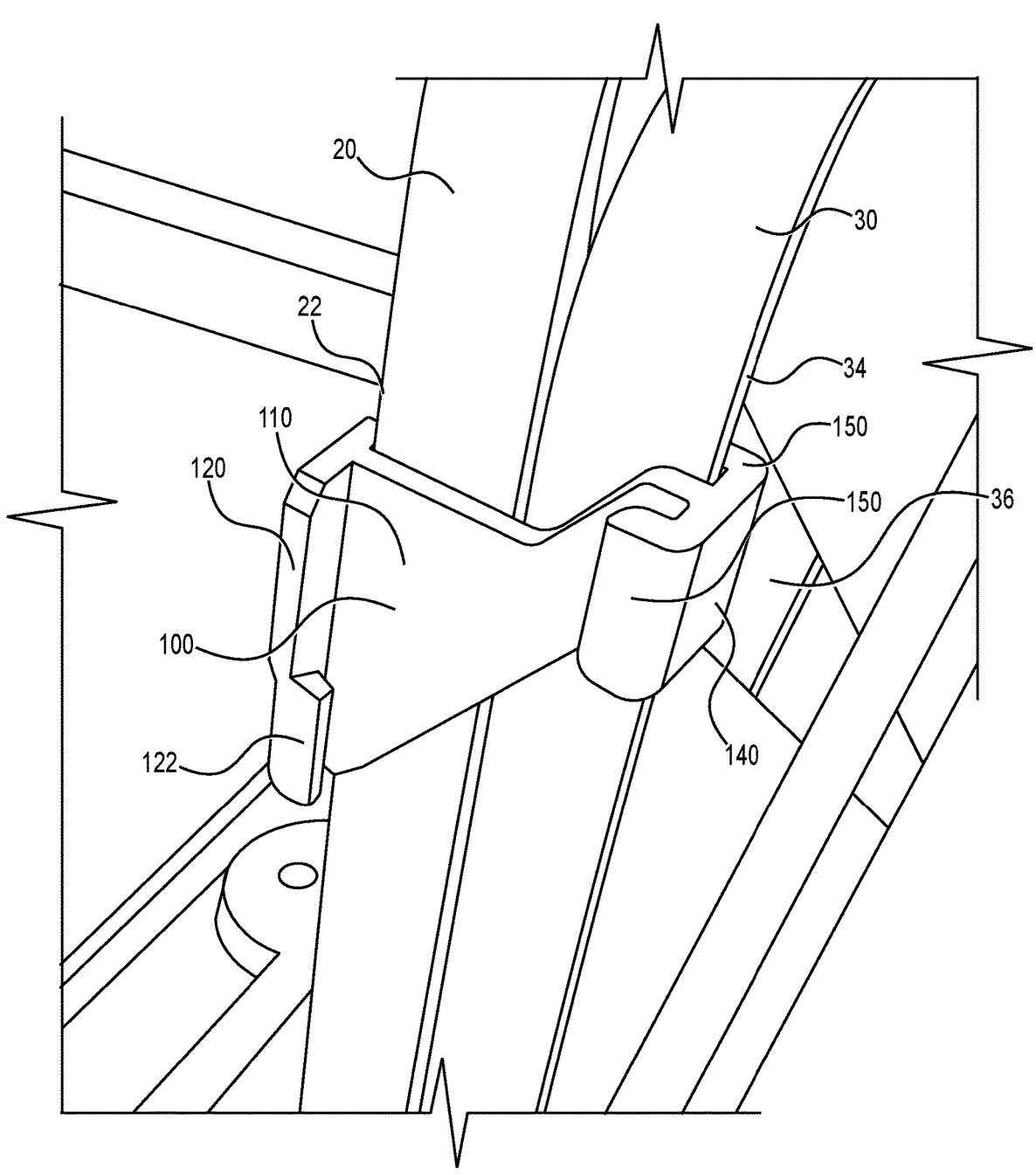
FIG. 14 is a partial perspective view of the cable tray clip of FIG. 1 mounted to two optical fiber cable trays.

FIG. 14 shows the engagement between lower engagement wing 150 and lower lip 34 of cable tray 30 in open area 36.

As shown by the above examples, embodiments of the disclosure provide a clip that connects two optical fiber cable trays together to cause the two cable trays to pivot together in a cable tray mounting bracket such that access to the bottom tray of the two trays is limited.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A coupling member for connecting two optical fiber cable trays together, comprising:

a middle portion extending in a first direction and having an upper end and a lower end at opposite ends along the first direction;

an upper portion at the upper end of the middle portion and structurally configured to extend laterally from the middle portion;

an upper engagement portion structurally configured to extend downward from the upper portion;

a lower portion at the lower end of the middle portion and structurally configured to extend laterally from the middle portion;

a lower engagement portion structurally configured to extend upward from the lower portion;

wherein the upper engagement portion is structurally configured to extend in a direction parallel to the first direction;

wherein the lower engagement portion is structurally configured to extend in a direction parallel to the first direction;

wherein the upper engagement portion and the middle portion are structurally configured to define an upper tray receiving portion;

wherein the lower engagement portion and the middle portion are structurally configured to define a lower tray receiving portion;

wherein the upper tray receiving portion is structurally configured to receive an upper lip of an upper one of two optical fiber cable trays;

wherein the lower tray receiving portion is structurally configured to receive a lower lip of a lower one of the two optical fiber cable trays; and wherein the coupling member is structurally configured to connect the two optical fiber cable trays together such that the two optical fiber cable trays are structurally configured to pivot together so as to limit access to the lower one of the two optical fiber cable trays.

2. The coupling member of claim 1, wherein the upper tray receiving portion comprises an upper groove.

3. The coupling member of claim 1, wherein the lower tray receiving portion comprises a lower groove.

4. The coupling member of claim 1, wherein the upper engagement portion comprises an upper wing, and the lower engagement portion comprises a lower wing.

5. The coupling member of claim 1, wherein the upper portion is structurally configured to be offset from the lower portion in a second direction that is perpendicular to the first direction.

6. The coupling member of claim 5, wherein the upper engagement portion is structurally configured to have a length in the second direction that is less than a length of the upper portion in the second direction.

7. The coupling member of claim 1, wherein the two optical fiber trays are pivotably connected to a cable tray mounting bracket.

8. The coupling member of claim 7, wherein the coupling member is structurally configured to connect the two optical fiber cable trays together such that the two optical fiber trays are structurally configured to pivot together in the cable tray mounting bracket.

9. The coupling member of claim 1, wherein the lower engagement portion is structurally configured to engage an opening in a lower area of the lower one of the two optical fiber cable trays; and wherein the engagement of the lower engagement portion with the opening in a lower area of the lower one of the two optical fiber cable trays is structurally configured to prevent the coupling member from moving relative to the lower one of the two optical fiber cable trays.

10. The coupling member of claim 1, wherein the upper engagement portion is structurally configured to slide relative to the upper lip of the upper one of the two optical fiber cable trays to permit the upper one of the two optical fiber cable trays to move relative to the lower one of the two optical fiber cable trays when the two optical fiber cable trays are pivoted.

11. The coupling member of claim 1, wherein the upper engagement portion is a first upper engagement portion, and the clip further comprises a second upper engagement portion, and the lower engagement portion is a first lower engagement portion, and the coupling member further comprises a second lower engagement portion.

12. A coupling member for connecting two optical fiber cable trays together, comprising:

a first portion extending in a first direction and having an upper end and a lower end at opposite ends along the first direction;

a second portion at the upper end of the first portion and structurally configured to extend laterally from the first portion;

a third portion at the lower end of the first portion and structurally configured to extend laterally from the first portion;

a first tray receiving portion formed by the second portion and the first portion;

a second tray receiving portion formed by the third portion and the first portion;

wherein the first tray receiving portion is structurally configured to receive an upper lip of an upper one of two optical fiber cable trays;

wherein the second tray receiving portion is structurally configured to receive a lower lip of a lower one of the two optical fiber cable trays; and wherein the coupling member is structurally configured to connect the two optical fiber cable trays together such that the two optical fiber cable trays are structurally configured to pivot together so as to limit access to the lower one of the two optical fiber cable trays.

13. The coupling member of claim 12, wherein a first engagement portion is structurally configured to extend downward from the second portion and is structurally configured to be adjacent to the first tray receiving portion.

14. The coupling member of claim 13, wherein the first engagement portion is structurally configured to extend in a direction parallel to the first direction.

15. The coupling member of claim 14, wherein a second engagement portion is structurally configured to extend upward from the third portion and is structurally configured to be adjacent to the second tray receiving portion.

16. The coupling member of claim 15, wherein the second engagement portion is structurally configured to extend in a direction parallel to the first direction.

17. The coupling member of claim 16, wherein the second engagement portion is structurally configured to engage an opening in a lower area of the lower one of the two optical fiber cable trays; and wherein the engagement of the second engagement portion with the opening in a lower area of the lower one of the two optical fiber cable trays is structurally configured to prevent the coupling member from moving relative to the lower one of the two optical fiber cable trays.

18. The coupling member of claim 12, wherein the first tray receiving portion comprises two first tray receiving portions, and the second tray receiving portion comprises two second tray receiving portions.

19. A coupling member for connecting two optical fiber cable trays together, comprising:

a first portion having a first end and a second end opposite the first end;

a second portion at the first end of the first portion and structurally configured to extend laterally from the first portion;

a third portion at the second end of the first portion and structurally configured to extend laterally from the first portion;

a first tray receiving portion at the first end of the first portion;

a second tray receiving portion at the second end of the first portion;

wherein the first tray receiving portion is structurally configured to receive a portion of a first one of two optical fiber cable trays;

wherein the second tray receiving portion is structurally configured to receive a portion of a second one of the two optical fiber cable trays; and wherein the coupling member is structurally configured to connect the two optical fiber cable trays together such that the two optical fiber cable trays are structurally configured to pivot together so as to limit access to the second one of the two optical fiber cable trays.

20. The coupling member of claim 19, further comprising a first engagement portion that is structurally configured to extend from the second portion in a direction parallel to the first portion.

21. The coupling member of claim 20, further comprising a second engagement portion that is structurally configured to extend from the third portion in a direction parallel to the first portion.

22. The coupling member of claim 21, wherein the second engagement portion is structurally configured to engage an opening in an area of the second one of the two optical fiber cable trays; and wherein the engagement of the second engagement portion with the opening in the area of the second one of the two optical fiber cable trays is structurally configured to prevent the coupling member from moving relative to the second one of the two optical fiber cable trays.

23. The coupling member of claim 19, wherein the first tray receiving portion comprises two first tray receiving portions, and the second tray receiving portion comprises two second tray receiving portions.

\* \* \* \* \*